Aug. 23, 1955 — A. SALVO — 2,715,869
POTATO CHIP MANUFACTURE
Filed Dec. 7, 1951 — 3 Sheets-Sheet 1
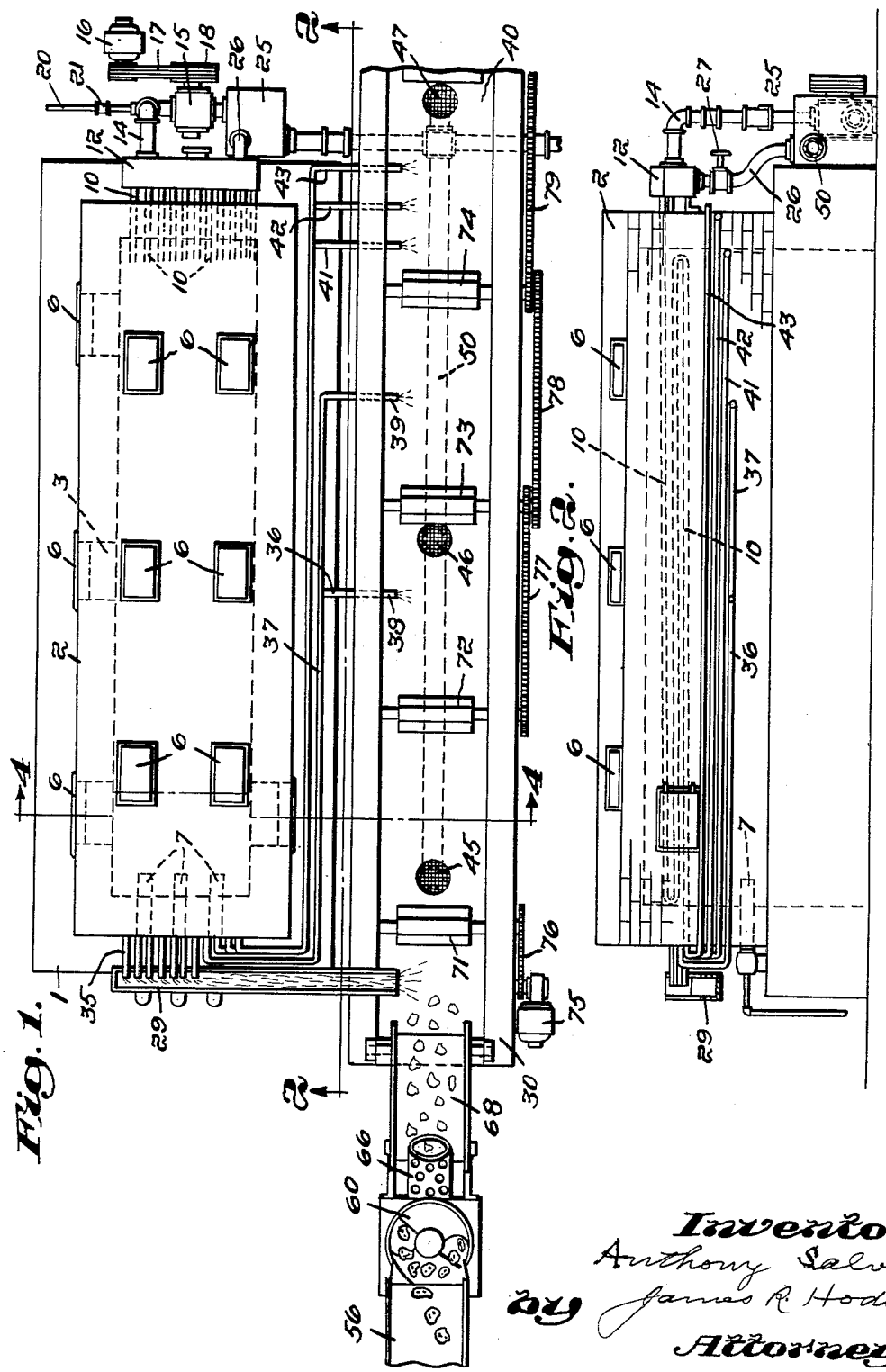

Aug. 23, 1955     A. SALVO     2,715,869
POTATO CHIP MANUFACTURE
Filed Dec. 7, 1951     3 Sheets-Sheet 2
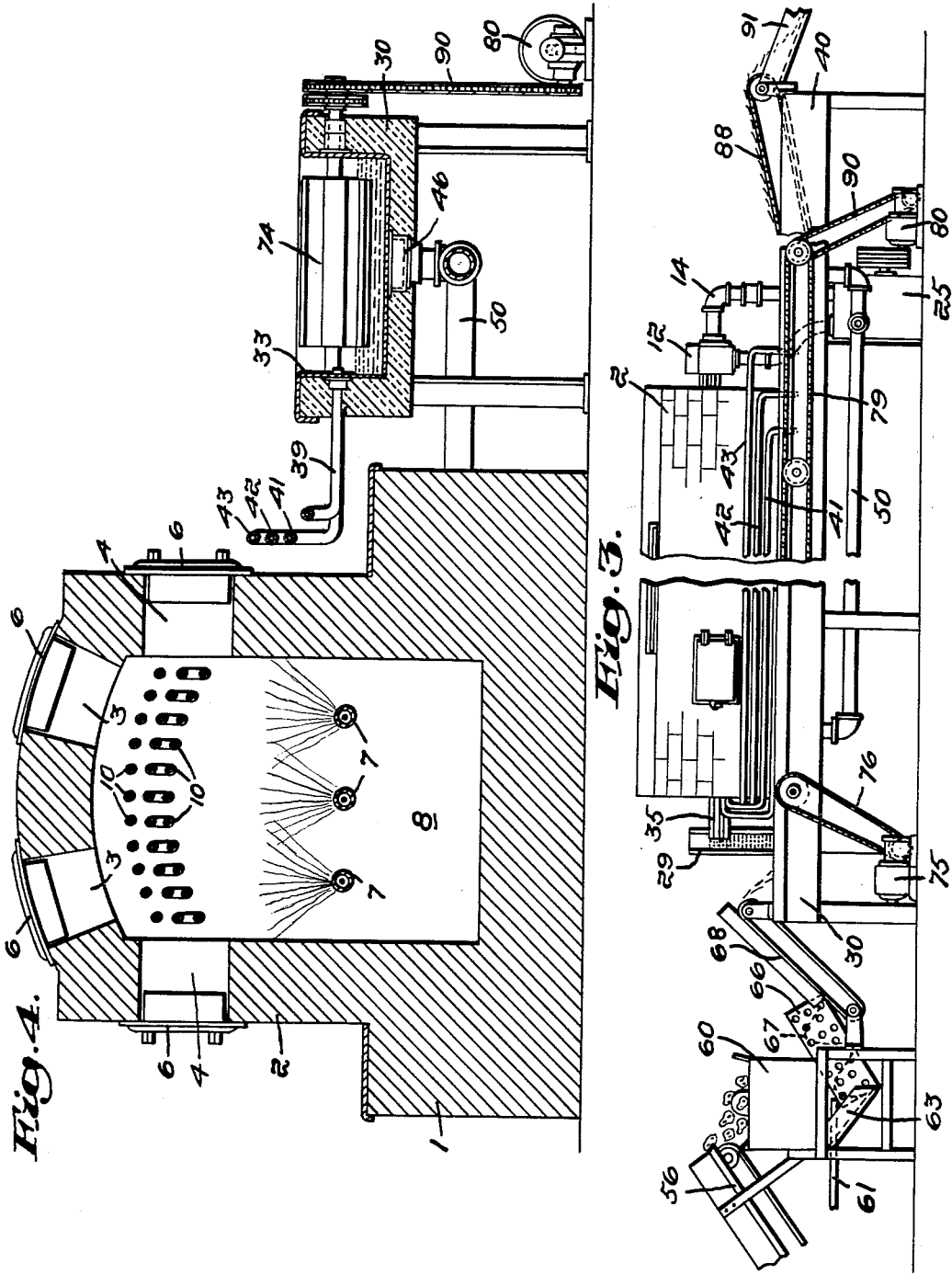
Inventor:
Anthony Salvo
by James R. Hodder
Attorney Aug. 23, 1955 A. SALVO 2,715,869
POTATO CHIP MANUFACTURE
Filed Dec. 7, 1951 3 Sheets-Sheet 3

Inventor:
Anthony Salvo
by James R. Hodder
Attorney

United States Patent Office 2,715,869
Patented Aug. 23, 1955

2,715,869

POTATO CHIP MANUFACTURE

Anthony Salvo, Fall River, Mass.

Application December 7, 1951, Serial No. 260,376

1 Claim. (Cl. 99—404)

My present invention is a novel and improved machine for and method of manufacturing potato chips and is directed particularly to improve and perfect the handling and cooking operations.

Heretofore it has been customary to provide a long cooking trough or kettle with a suitable heat supply, usually burning gas, fuel oil, or the like, underneath the kettle and in contact with the outside of the kettle bottom. Fluid cooking oil is supplied to the kettle and the cut and sliced potatoes float along the surface of the cooking oil and are pushed by paddles, or the like, throughout the length of the cooker.

A serious prior difficulty of such customary methods and apparatus was that the heat at the bottom of the trough had to be upwards of 400° F. in order to maintain the temperature of the cooking oil and circulating at approximately 360° at the top where the sliced potatoes were floating. As the high temperature on the bottom fluctuated greatly, it often resulted in overburning the cooking oil at the bottom of the cooker. Furthermore, small or broken particles of the sliced potatoes would drop to the bottom of the trough and burn.

Therefore, in order to protect the main mass of the sliced potatoes floating along the top, a considerable depth of cooking oil was required in the cooker, providing a substantial depth and thus, also, requiring a substantially large amount of oil to be kept in the cooker throughout the day's work.

Furthermore, the excessive heat at the bottom of the cooker caused to deposit, which, accumulating with the burned particles of potatoes that dropped to the bottom of the tank, built up an accumulation of residue, requiring the bottom of the tanks to be scraped by hand and also resulted in the discarding of the entire quantity of cooking oil used because of the overheating, discoloration, and damage.

My present invention is directed to eliminate the difficulties above briefly outlined and to provide a novel process and apparatus which will insure a more uniform cooking of the sliced potatoes, eliminating any possibility of overburning or overheating, preventing particles from dropping to the bottom of the cooking tank, by screening out the small particles before entering the cooker, and furthermore to use a relatively small quantity of cooking oil, viz., three or four inches in depth, to keep the oil in constant circulation by a pump, preserving the cooking oil so used against discoloration or damage so that it can be readily filtered and re-used, being admixed with a supply of new oil, and positively feeding the sliced potatoes at a predetermined depth in the oil, thereby insuring a more uniform cooking, all automatically controlled.

A further advantage is that I prefer to power spray for washing the slices as they drop from the slicer, in place of former methods of simply blowing the slices to be dropped into water.

These advantages also enable me to employ the highest grade and more expensive cooking oil, such as peanut oil, as a much smaller quantity is required for the circulation throughout the system, and a permanent life of usefulness is obtained because of prevention of discoloration and impairing the efficiency of the oil.

By my novel system of cooking and automatic controls, I am enabled to employ a low oil capacity cooker, which, for example, allows me to add 1600 pounds of oil in a ten hour day, to a 950-pound capacity of oil in the smaller cooker, which gives 700 pounds more than the cooker holds in comparison to prior machines that hold 1900 pounds capacity and are only capable of adding 1300 pounds of oil or shortening.

In carrying out my present invention, I utilize a separate heating boiler to heat the cooking oil, which oil is preferably fed by a pump thru a plurality of sets of tubes thru the boiler and thence directly into the cooking trough at a plurality of points. Automatic heat controlling means is provided so that the heated oil is supplied to the cooker at predetermined temperatures and predetermined points along the length of the cooker to thus maintain any desired critical temperature. Thus, instead of having the fire underneath the kettle and the kettle heating the oil in the cooker, I first heat the oil and it heats the cooker so that no excess degree of heat is involved throughout the depth of the oil. I am thereby enabled to use a relatively shallow and small quantity of cooking oil throughout the length of the cooker to a depth of, for example, three or four inches.

Thus I am enabled to save upwards of one-half the quantity of oil in the circulating system, and by preventing overheating I preserve the efficiency of the cooking oil so used, whereby it can be readily re-used as above noted.

My improved arrangement and process insures a more uniform product, eliminates all danger of burning, saves undue accumulation of residue at the bottom of the tank, and hence eliminates the daily hand-scraping formerly required; and in combination with my novel screening element, it prevents small broken particles of potatoes from going into the cooker and accumulating at the bottom of the trough.

A further feature of my present apparatus is that I can conduct the tubes carrying the heated oil in circulation directly over the boiler into a plurality of points throughout the length of the cooker, thereby maintaining uniform heat along the floating cooking oil.

For this purpose I supply a larger quantity of heated oil at the potato feeding-in end of the cooker and conduct supplemental supplies of heated oil by leading the oil-carrying tubes directly from the boiler at a point, or points, intermediate the length of the cooking tank. To supplement this action, I may also supply a plurality of drainage points directly underneath the cooking tank to allow the partly cooled oil to be withdrawn, regulating such quantity by a valve and, thus, I provide a plurality of circulating stations throughout the length of the tank, and in regulated quantities, withdrawing a part of the cooled oil and feeding in freshly heated cooking oil.

As the sliced potatoes are fed into the tank while cold, it will be appreciated that they tend to reduce the temperature of the cooking oil at that part of the tank and, hence, as they are carried along I find that the temperature may drop slightly; and at such critical points I provide the new heated oil supply and a partial drainage equipment so as to maintain the circulating oil both at the desired depth and critical temperature.

A still further feature consists in my novel spray-washing, screening, drying, sorting, and grading, or the like means which is a distinct novelty in this art so far as I am informed. It is customary to have an assembly of a potato peeler, feeding peeled potatoes into a slicer, and the sliced potatoes may be fed directly into the heating tank or thru a washer and, thence, into the tank, and from the end of the tank the now-cooked chips are conducted to the salting apparatus and, thence, to a packaging machine.

In my present improved construction of continuous and positively controlled manufacture, I provide a separate heating boiler which may be positioned alongside the cooker and I arrange a potato slicer and then a spray-washing apparatus which feeds into a combined feeding, screening, drying, and gauging member, permitting the small particles or broken pieces of the sliced potatoes to be screened out so that only complete, full-sized, uniform, and marketable potato slices will be fed into the cooker, resulting in more desirable and uniformly sized potato chips going thru the cooker, and no oil is wasted on smaller broken particles, and none of such objectionable particles clog or cause an accumulation in the cooker.

Further important features consist in the automatic control of the heat supply which will maintain the circulating oil at a desired temperature, as well also as control, if desired, of the pumping means which will determine the quantity and speed of circulation thru the tubes passing thru the boiler and cooker.

I also desire to provide the tubes with a substantial downward slant thru the boiler and apparatus to thus facilitate the cleaning out of the oil when the heat is shut down. In fact, I contemplate utilizing a blower which will further clean the tubes after the oil has been drained therefrom. Control shut-off means are also utilized to shut off the heat in case of breakage, stoppage, or accident, and to open doors to dissipate the heat, thereby protecting the apparatus, preventing damage to the heating oil.

An additional safety feature is that I supply the heating elements sufficiently remote or spaced from the cooking oil so as to eliminate the fire hazard in the cooker, the oil itself being enclosed and circulated in pipes, and then conducted to the cooker at various points as above explained.

The economy in my use of the circulating oil is most important, and the preserving of the efficiency and purity of the cooking oil so that it can be readily filtered and returned thru the circulating tubes while admixed with such quantity of fresh oil as may be necessary, since the potato chips absorb a predetermined amount, is also an important advantage, while the feeding of the slices at a predetermined depth thru the oil in the cooker is a most desirable novelty.

Referring to the drawings illustrating preferred embodiments:

Fig. 1 is a plan view of my improved apparatus to carry out my novel process;

Fig. 2 is a side view of the cooker or kettle, viewing the same on the line 2—2 of Fig. 1 looking in the direction of the arrows;

Fig. 3 is a side elevational view of the apparatus;

Fig. 4 is an enlarged cross-sectional view on the line 4—4 of Fig. 1;

Figure 5:
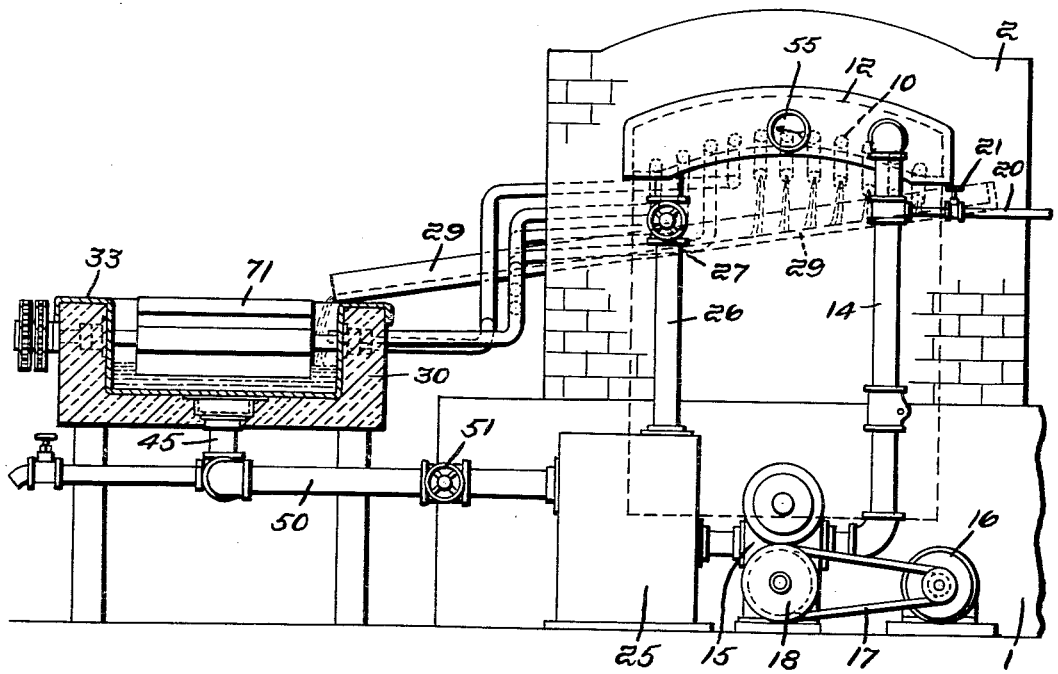
Fig. 5 is an end view looking from the right of Fig. 1.

As shown in the drawings, 1 indicates a brick-enclosed boiler having an upper extension 2, wherein are a plurality of open hatchways 3—3 along the top and 4—4 at the sides to permit access for cleaning and to provide a plurality of openings to dissipate the heat when the fire is shut off, enclosed by removable covers 6—6. A series of burners 7—7, preferably oil or gas, are fitted at one end in the firing chamber 8; and along the upper part of the boiler are sets of oil-carrying tubes 10—10, preferably extending lengthwise of the boiler, and returning to give a doubled or tripled transmission of the oil to be heated flowing thru the tubes.

Said tubes are led in from a manifold 12, into which oil is supplied under pressure thru a conduit 14 from a pump 15, actuated by a motor 16 thru a belt 17 to a pulley 18, as best shown in Figs. 1 and 5. New oil may be admitted in any suitable way, but as here shown I provide a pipe 20 from any suitable source of supply regulated by a valve 21. The pump 15 is arranged to draw a supply of oil from a filtering sump 25 into which the oil is returned after passing thru a cooker and thence thru a filter in the sump 25.

I also provide a by-pass 26 controlled by a valve 27 extending from the manifold 12 into the sump 25 so that the pump can be operating at normal speed, keeping the oil in forced circulation thru the manifold 12 and the series of tubes 10. These tubes extend in doubled relation and preferably incline downwardly at an angle to facilitate cleaning and are led lengthwise of the fire box 8, and a plurality of these tubes deliver the heated oil at the opposite end into a trough 29, which, in turn, delivers the heated oil into the end of the cooker 30.

This cooker or kettle 30 is preferably arranged in close proximity to and parallel with the boiler 1 and lined with aluminum 33, this material being found satisfactory to keep the heated oil in condition and prevent tarnishing and discoloring.

It will be appreciated that as the sliced potatoes are delivered at the intake end of the cooker 30, they are in a cold condition and in order to take care of this situation, I direct a considerable number of the tubes 10 carrying the heated oil from the boiler to the cooker sufficient to compensate for the initial carrying of the potato slices thus delivered. Any desired number of the tubes 10 can be directed to the intake end of the cooker.

As here shown, a series of such tubes, indicated generally at 35, may be led directly into the cooker or thru a trough 29, which may be insulated and covered, but I prefer to lead a selected number of the oil-carrying tubes to provide fresh and heated oil lengthwise of the cooker so as to maintain the proper temperature, viz. approximately 340° to 360° F. throughout the cooker. By this means also I may control the temperature lengthwise of the cooker 30, as may be found expedient.

I have herein illustrated a set of the tubes 36 and 37, discharging into the cooker midway of the length, as indicated at 38 and 39 respectively, with the further set of the tubes led adjacent the outgoing or delivery end 40 of the cooker 30, as indicated at 41, 42, and 43 to discharge the heated oil at the delivery end. It will be appreciated that the heated oil being positively circulated into and thru the cooker at these various points of delivery will cause a continuous flow and thus maintain the oil in proper condition.

To still further control the heat supply and condition, I provide a series of drains in the bottom of the cooker, as indicated at 45, 46, and 47 to withdraw the partially cooled oil at the bottom of the cooker and lead same thru a conduit 50, controlled by a valve 51, back into the filter and sump 25.

I contemplate utilizing any suitable or desired automatic controls to govern the heat thru the burner 7 which may be regulated by temperature or pressure, as indicated by a dial 55, or otherwise, so as to keep the flow of heated oil from the boiler to the cooker at the critical temperature desired. In addition, the customary or usual safety devices to shut off the fuel thru the burners 7 will also be utilized.

As thus far described, it will be appreeciated that my novel and improved apparatus for the automatic manufacture of potato chips, or the like, utilizing heated oil as the cooking element, carries out my novel process of heating the oil remote from the cooker or kettle, preventing the oil in the kettle from becoming overheated at the bottom, insuring the maintenance of the oil in proper condition, permitting it to be re-used instead of as formerly being thrown away at the end of each day's work. Also, by having the cooking kettle spaced, protected, and remote from the fire the danger and hazard of getting the oil either overheated or catching on fire is prevented.

In order to supply the sliced potatoes in desired quantity to the cooker, I contemplate utilizing any suitable potato peeler adjacent the feeding end of the cooker 30, wherein the same are led by a chute 56 from the peeler into a slicer 60, which is preferably of the well known Knott Slicing Machine illustrated in patent application Serial No. 250,105 filed October 6, 1951, now abandoned, which automatically slices the potatoes and as the same are dropped from the slicer 60, I provide a spray-washing apparatus, as indicated at 61, Fig. 3, wherein water under pressure from any suitable source is supplied thru a pipe and into a spraying nozzle in the path of the sliced potatoes as they drop from the slicer 60 into a receptacle 63, from whence they are delivered into my novel combined screening, drying, and feeding device 66.

This is a perforated rotatable cylindrical screen having a spiral rubber feeding rib, or ribs, indicated in dotted lines at 67, Fig. 3, which screen is rotated in any suitable manner and permits the sliced potatoes to be dried as they are fed to a conveyor 68, leading the sliced potatoes directly into the delivery end of the cooker 30. From thence, the sliced potatoes, which normally flow on the surface of the heated oil 70, may be moved lengthwise of the tank by a series of usual type of paddles 71, 72, 73 and 74. These paddles are generated in the sides of the top of the cooker 30, and the first paddles 71 rotated by a motor 75 and sprocket chains 76, the other paddles being similarly rotated by connecting sprocket chains 77, 78, and 79 from a motor 80, or in any other suitable or usual manner as shown in the drawings.

Figure 6:
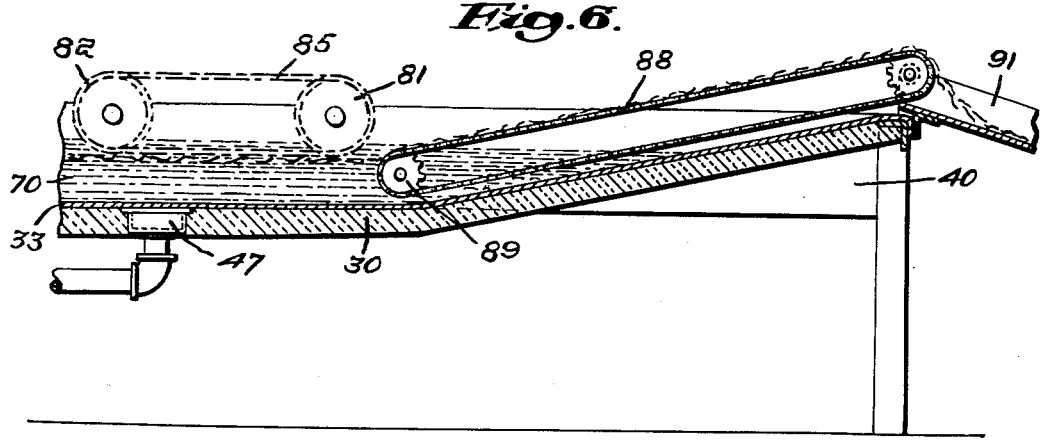
Fig. 6 is an enlarged cross-sectional view of a modification showing the means for feeding the sliced potatoes while immersed in the cooking oil.

Instead of the paddles 71, 72, 73, 74, or any combination of the same, I prefer to utilize a mesh chain conveying element, as shown in Fig. 6, which will hold the floating sliced potatoes underneath the surface of the oil level, preferably at a predetermined depth, and preferably also near the delivery end 40 of the kettle 30.

For this purpose I provide a pair of sprockets indicated at 81 and 82 over which an openwork mesh chain element, the full width of the interior of the cooker, is rotated, said mesh belt or chain 85 acting on top of the floating sliced potatoes as they approach the delivery end of the cooker, thereby depressing them a predetermined depth below the level, thus insuring full and complete cooking of the entire mass of sliced potatoes being fed thru the cooker. This feature is of special importance and a distinct novelty in this art and overcomes the difficulty heretofore found with the use of paddles, which latter tended to raise the sliced potatoes lifting them, or a part of them, out of the cooking oil and, hence, apt to cause a variation in the resultant potato chips, some being overcooked and some being undercooked. By my method of positively submerging the sliced potatoes, either at a portion or throughout the entire extent of their travel in the cooker, I secure a positive and more uniform cooking action. This openwork chain belt 85 may be operated at any speed desired and the sprockets actuated by a belt connection with either of the motors already indicated, or from a separate motor if desired.

At the delivery end 40 of the tank, a conveyor 88 of usual type operated between sprockets 89 and connected with the motor 80 by the belt 90, which may also be utilized to rotate the sprocket chain 79 and the paddles, is arranged whereby the now cooked potato chips are delivered into a trough 91 and thence to the usual sorting and packaging stations.

I claim:

A machine for cooking potato chips, comprising an elongated heater having a firing chamber therein, an elongated cooker disposed adjacent said heater, a series of fuel burners projecting into said chamber from one end of said heater, sets of oil-carrying tubes disposed within said chamber above said burners and extending lengthwise of the chamber, a manifold at one end of said heater externally thereof and with which corresponding ends of all of said tubes are in communication, the opposite ends of one set of tubes communicating with the cooker adjacent the feed end thereof, the opposite ends of a second set of the tubes communicating with the cooker intermediate the ends thereof, and the opposite ends of a third set of the tubes communicating with the cooker adjacent the discharge end thereof, the first set of tubes being greater in number than that of the second and third set of tubes, an oil sump disposed at said one end of the heater beneath said manifold, a conduit leading from said sump to said manifold, a pump interposed in said conduit for supplying oil to said tubes under pressure, a plurality of oil drains in the bottom wall of said cooker, a conduit beneath said cooker with which said drains are in communication, said conduit being in communication with said sump and being provided with a valve for regulating the draining of oil from the cooker into said sump.

References Cited in the file of this patent

UNITED STATES PATENTS

| Number | Name | Date |
|---|---|---|
| 851,687 | McKenzie | Apr. 30, 1907 |
| 928,795 | Prims | July 20, 1909 |
| 1,234,131 | Cleveland | July 24, 1917 |
| 1,401,945 | Morris | Dec. 27, 1921 |
| 1,659,415 | Thomas | Feb. 14, 1928 |
| 1,743,833 | Stall | Jan. 14, 1930 |
| 1,926,313 | Smith | Sept. 12, 1933 |
| 2,057,366 | Chapman | Oct. 13, 1936 |
| 2,163,977 | Ferry | June 27, 1939 |
| 2,207,316 | Ferry | July 9, 1940 |
| 2,249,792 | Skinner | July 22, 1941 |
| 2,286,644 | Pringle et al. | June 16, 1942 |
| 2,314,871 | De Back | Mar. 30, 1943 |
| 2,427,388 | Curran | Sept. 16, 1947 |
| 2,538,937 | Foster | Jan. 23, 1951 |

FOREIGN PATENTS

| Number | Country | Date |
|---|---|---|
| 472,838 | Great Britain | Sept. 30, 1937 |